US010443657B2

(12) United States Patent
Nakawatari et al.

(10) Patent No.: US 10,443,657 B2
(45) Date of Patent: Oct. 15, 2019

(54) POWER TRANSMISSION DEVICE FOR VEHICLE

(71) Applicant: TOYOTA JIDOSHA KABUSHIKI KAISHA, Toyota-shi, Aichi-ken (JP)

(72) Inventors: Kodo Nakawatari, Toyota (JP); Hiroki Kuwamoto, Toyota (JP); Akitaka Ichikawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 300 days.

(21) Appl. No.: 15/247,241

(22) Filed: Aug. 25, 2016

(65) Prior Publication Data
US 2017/0067512 A1    Mar. 9, 2017

(30) Foreign Application Priority Data
Sep. 7, 2015   (JP) .................. 2015-176201

(51) Int. Cl.
| F16D 1/02 | (2006.01) |
| F16D 1/10 | (2006.01) |
| F16H 57/00 | (2012.01) |
| B60K 6/20 | (2007.10) |
| B60K 6/26 | (2007.10) |
| F16H 3/72 | (2006.01) |

(Continued)

(52) U.S. Cl.
CPC .................. *F16D 1/02* (2013.01); *B60K 6/20* (2013.01); *B60K 6/26* (2013.01); *B60K 6/36* (2013.01); *F16D 1/0835* (2013.01); *F16D 1/10* (2013.01); *F16H 3/727* (2013.01); *F16H 57/0006* (2013.01); *B60Y 2300/74* (2013.01); *F16D 2001/103* (2013.01); *F16D 2300/22* (2013.01); *Y10S 903/904* (2013.01)

(58) Field of Classification Search
CPC .... F16D 1/0835; F16C 27/02; F16H 57/0006; Y10T 403/7026; Y10T 403/7028; Y10T 403/7032; Y10T 403/7033; Y10T 403/7035; Y10T 403/7061
See application file for complete search history.

(56) References Cited

U.S. PATENT DOCUMENTS 3,626,743 A * 12/1971 Koch ..................... B21D 53/16
                                                    72/330
4,286,894 A *  9/1981 Rongley ............... F16D 1/0835
                                                    403/372

(Continued)

FOREIGN PATENT DOCUMENTS

JP    2004-353785 A    12/2004
JP    2011-214646 A    10/2011

(Continued)

*Primary Examiner* — Matthieu F Setliff
(74) *Attorney, Agent, or Firm* — Oliff PLC (57) ABSTRACT

A power transmission device includes a rotor shaft, a gear shaft, and a rattling suppression member. The rattling suppression member is provided between a first shaft end portion and the gear shaft or between a second shaft end portion and the rotor shaft. The first shaft end portion is a portion, protruding to the gear shaft side from one of a pair of first bearings, of the rotor shaft, while the second shaft end portion is a portion, protruding to the rotor shaft side from one of a pair of second bearings, of the gear shaft.

3 Claims, 5 Drawing Sheets

(51) Int. Cl.
*F16D 1/08* (2006.01)
*B60K 6/36* (2007.10)

(56) References Cited

U.S. PATENT DOCUMENTS

| | | | | |
|---|---|---|---|---|
| 4,429,242 A * | 1/1984 | Layh | H02K 9/14 | 310/112 |
| 4,560,895 A * | 12/1985 | Zahner | H02K 7/1025 | 188/162 |
| 4,828,423 A * | 5/1989 | Cramer, Jr. | F16D 1/0835 | 403/326 |
| 6,805,017 B2 * | 10/2004 | Chikaraishi | B62D 5/0409 | 180/443 |
| 7,766,778 B2 * | 8/2010 | Tabata | B60K 6/405 | 180/65.22 |
| 7,942,775 B2 * | 5/2011 | Tabata | B60K 6/365 | 475/5 |
| 9,074,637 B2 * | 7/2015 | Slayne | G11B 5/4813 | |
| 10,001,206 B2 * | 6/2018 | Fujii | F16H 57/12 | |
| 10,017,041 B2 * | 7/2018 | Ichikawa | B60K 6/365 | |
| 2002/0112555 A1 * | 8/2002 | Chikaraishi | B62D 5/0409 | 74/388 PS |
| 2007/0213161 A1 * | 9/2007 | Tabata | B60K 6/365 | 475/5 |
| 2007/0225098 A1 * | 9/2007 | Tabata | B60K 6/365 | 475/5 |
| 2015/0000098 A1 * | 1/2015 | Slayne | G11B 5/4813 | 29/428 |
| 2015/0001025 A1 * | 1/2015 | Slayne | F16D 1/0835 | 192/56.1 |
| 2015/0076940 A1 * | 3/2015 | Ohashi | H02K 1/185 | 310/58 |
| 2015/0114549 A1 * | 4/2015 | Slayne | F16C 27/02 | 156/220 |
| 2017/0067512 A1 * | 3/2017 | Nakawatari | F16D 1/02 | |
| 2017/0167591 A1 * | 6/2017 | Fujii | F16H 57/0006 | |
| 2017/0167592 A1 * | 6/2017 | Fujii | F16H 57/12 | |
| 2017/0167593 A1 * | 6/2017 | Fujii | F16H 57/12 | |
| 2017/0227109 A1 * | 8/2017 | Fujii | F16H 57/12 | |
| 2017/0314649 A1 * | 11/2017 | Michikoshi | F16H 57/12 | |
| 2017/0314659 A1 * | 11/2017 | Michikoshi | F16H 57/08 | |
| 2018/0119746 A1 * | 5/2018 | Torii | F16D 1/02 | |
| 2018/0187767 A1 * | 7/2018 | Fujii | F16H 57/0006 | |

FOREIGN PATENT DOCUMENTS

| | | |
|---|---|---|
| JP | 2012-62991 A | 3/2012 |
| JP | 2014-145383 A | 8/2014 |

* cited by examiner

POWER TRANSMISSION DEVICE FOR VEHICLE

INCORPORATION BY REFERENCE

The disclosure of Japanese Patent Application No. 2015-176201 filed on Sep. 7, 2015 including the specification, drawings and abstract is incorporated herein by reference in its entirety.

BACKGROUND

1. Technical Field

The disclosure relates to a power transmission device for a vehicle and, in particular, relates to a technique of suppressing the wear of a rattling suppression member due to radial vibration.

2. Description of Related Art

For example, the following vehicle power transmission device is known. The vehicle power transmission device includes a rotor shaft and a gear shaft. The rotor shaft is formed with first spline teeth and is rotatably supported by a pair of first bearings. The gear shaft is formed with second spline teeth that are spline-fitted to the first spline teeth, and is supported by a pair of second bearings so as to be rotatable about an axis common to the rotor shaft. In this vehicle power transmission device, for example, when vibration such as torque fluctuation of an engine is transmitted when the rotor shaft is rotated with no load, there is a possibility that rattling, radial vibration, and noise such as tooth hitting noise may occur at a spline fitting portion. The spline fitting portion is coupled in a power transmittable manner to a driving source such as the engine via the gear shaft meshing with a gear to which the power from the driving source is transmitted.

In order to reduce the problem of radial vibration and tooth hitting noise at the spline fitting portion, for example, in Japanese Patent Application Publication No. 2004-353785 (JP 2004-353785 A), the clearance in the circumferential direction between female spline teeth and male spline teeth forming a spline fitting portion is set to be smaller than that between standard spline teeth. In this way, rattling at the spline fitting portion is suppressed.

Further, in order to suppress rattling at the spline fitting portion, for example, a rattling suppression member that is elastically deformable in the radial direction is disposed between a rotor shaft and a gear shaft facing the rotor shaft in the radial direction. By suppressing rattling at the spline fitting portion in this way, it is considered to reduce the occurrence of radial vibration and noise such as tooth hitting noise.

SUMMARY

In the meantime, due to a gear meshing reaction force that is generated by meshing with a gear configured to be rotated by a driving force of a driving source, radial load is input to the rattling suppression member disposed for suppressing rattling at the spline fitting portion. The radial load is vibration that occurs in the radial direction perpendicular to the axial direction of the gear shaft. Contact surfaces, contacting the rotor shaft and the gear shaft, of the rattling suppression member are worn out due to friction torque generated in torque transmission between the rotor shaft and the gear shaft and the above-described radial load. In the case where the rattling suppression function is exhibited by press-fitting the rattling suppression member, there is a possibility that the rattling suppression function may be reduced due to the wear of the contact surfaces contacting the rotor shaft and the gear shaft. In particular, in the case where a supported portion of the rotor shaft is disposed on the outer peripheral side of the rattling suppression member, the supported portion of the rotor shaft is not easily bent and deformed when the radial load is input to the rattling suppression member. Therefore, there is a possibility that the wear of the rattling suppression member due to the radial load may become more significant. The rotor shaft is rotatably supported by first bearings so as to have high flexural rigidity.

The disclosure has been made in view of the above circumstances and provides a vehicle power transmission device in which the wear of a rattling suppression member is suppressed. The rattling suppression member suppresses rattling due to radial vibration.

An example aspect of the disclosure is a power transmission device for a vehicle, the power transmission device including: a rotor shaft supported by a pair of first bearings and configured to rotate, the rotor shaft including first spline teeth; a gear shaft supported by a pair of second bearings and configured to rotate about an axis common to the rotor shaft, the gear shaft including second spline teeth that are spline-fitted to the first spline teeth; and a rattling suppression member that is press-fitted into a portion where the rotor shaft and the gear shaft overlap each other in a radial direction and a portion where neither the first spline teeth nor the second spline teeth are provided, the rattling suppression member provided between a first shaft end portion and the gear shaft or between a second shaft end portion and the rotor shaft, wherein the first shaft end portion is a portion, protruding to the gear shaft side from one of the pair of first bearings, of the rotor shaft, and the second shaft end portion is a portion, protruding to the rotor shaft side from one of the pair of second bearings, of the gear shaft.

According to this configuration, the rattling suppression member is press-fitted into the portion where the rotor shaft and the gear shaft overlap each other in the radial direction and where neither the first spline teeth nor the second spline teeth are formed, the rattling suppression member provided between the first shaft end portion and the gear shaft or between the second shaft end portion and the rotor shaft. Accordingly, the rattling suppression member is attached between the first shaft end portion and the gear shaft or between the second shaft end portion and the rotor shaft. The first shaft end portion is a portion of the rotor shaft, whose support rigidity is lower than that of a portion supported by one of the pair of first bearings and which protrudes to the gear shaft side. The second shaft end portion is a portion of the gear shaft, whose support rigidity is lower than that of a portion supported by one of the pair of second bearings and which protrudes to the rotor shaft side. With this configuration, when radial load is input to the rattling suppression member, the shaft end portion, protruding to the gear shaft side, of the rotor shaft is deformed in the radial direction. Therefore, a radial reaction force that acts on the rattling suppression member is reduced so that the wear of the rattling suppression member is suppressed.

In the power transmission device, the rattling suppression member may be a member formed by bending a metal plate into an annular shape. The rattling suppression member any include a plurality of projections projecting radially outward and arranged in a circumferential direction.

According to this configuration, the rattling suppression member is the member formed by bending the metal plate into the annular shape and has the plurality of projections projecting radially outward and arranged in the circumferential direction. Therefore, radial load that acts on the rattling suppression member when radial vibration is transmitted to the rattling suppression member is reduced. Accordingly, deformation of the rattling suppression member in the radial direction due to the wear between the rotor shaft and the gear shaft is suppressed. Consequently, a reduction in the function of the rattling suppression member to suppress tooth hitting noise at the spline fitting portion by generating friction between the rotor shaft and the gear shaft is suppressed.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinbelow, an embodiment of a power transmission device for a vehicle will be described in detail with reference to the drawings.

Figure 1:
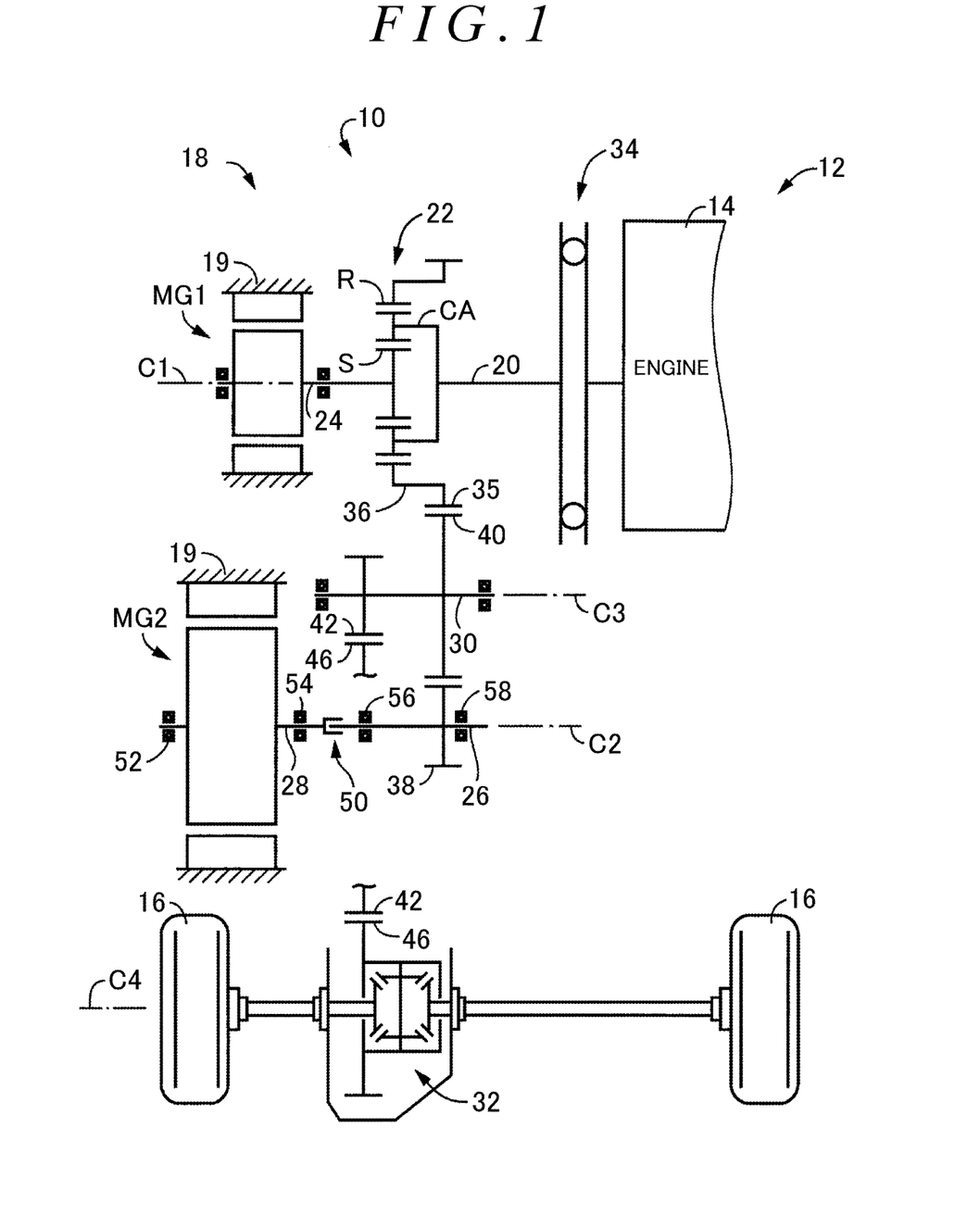
FIG. 1 is a skeleton diagram for explaining the structure of a driving device including a power transmission device to which the disclosure is applied.

FIG. 1 is a skeleton diagram for explaining the structure of a driving device 12 provided in a hybrid vehicle 10 (vehicle) of the embodiment. The driving device 12 includes an engine 14 and a power transmission device 18 for a vehicle (hereinafter simply referred to as the power transmission device 18) that transmits the power of the engine 14 to drive wheels 16. The engine 14 serves as a travel drive power source (power source) and is, for example, a known gasoline engine or diesel engine. The power transmission device 18 has four axes of rotation (C1 to C4) parallel to each other in a case 19 which is a non-rotary member. The first axis C1 coincides with an axis of rotation of the engine 14 and an output shaft 20, a power distribution mechanism 22, and a first rotor shaft 24 of a first electric motor MG1 are rotatably supported on the first axis C1. A reduction shaft 26 and a second rotor shaft 28 of a second electric motor MG2 are rotatably supported on the second axis C2. A counter shaft 30 is rotatably supported on the third axis C3. A differential gear 32 is rotatably supported on the fourth axis C4. The reduction shaft 26 is an example of a gear shaft of the power transmission device, while the second rotor shaft 28 is an example of a rotor shaft of the disclosure.

On the first axis C1, the output shaft 20 is coupled to the engine 14 via a damper device 34. The power distribution mechanism 22 is interposed between the output shaft 20 and the first electric motor MG1. The power distribution mechanism 22 is mainly composed of a sun gear S, a ring gear R, and a carrier CA. The sun gear S and the ring gear R are gears that are rotatable about the first axis C1. The carrier CA supports pinion gears meshing with the sun gear S and with the ring gear R such that the pinion gears are rotatable on their own axes and around the sun gear S. The sun gear S is coupled to the first rotor shaft 24 of the first electric motor MG1 so as to be prevented from rotation relative to the first rotor shaft 24. The carrier CA is connected to the engine 14 via the output shaft 20 and the damper device 34. The ring gear R is integrally formed with an inner peripheral portion of a composite gear shaft 36 that is formed with a counter drive gear 35. Therefore, the rotation of the ring gear R is transmitted to the counter drive gear 35.

On the second axis C2, the second rotor shaft 28 of the second electric motor MG2 is connected to the reduction shaft 26 via a spline fitting portion 50. The reduction shaft 26 is formed with a reduction gear 38 in the form of helical teeth. The reduction gear 38 meshes with a counter driven gear 40 formed on the counter shaft 30. The reduction shaft 26 and the counter shaft 30 are connected to each other in a power transmittable manner via a gear pair (helical gear) composed of the reduction gear 38 and the counter driven gear 40. The second rotor shaft 28 of the second electric motor MG2 is supported at both axial ends thereof by a ball bearing 52 and a ball bearing 54 so as to be rotatable about the second axis C2. The reduction shaft 26 is supported at both axial ends thereof by a ball bearing 56 and a ball bearing 58 so as to be rotatable about the second axis C2.

The counter shaft 30 disposed on the third axis C3 is integrally formed with the counter driven gear 40 and with a differential drive gear 42. The counter driven gear 40 meshes with the counter drive gear 35 and with the reduction gear 38. The differential drive gear 42 meshes with a differential ring gear 46 of the differential gear 32. In this way, since the counter driven gear 40 meshes with the counter drive gear 35 and with the reduction gear 38, the power of the engine 14 and the power of the second electric motor MG2 are transmitted. Since the counter shaft 30 is connected to the engine 14 and to the second electric motor MG2 in a power transmittable manner, the power of the engine 14 and the power of the second electric motor MG2 are transmitted.

The differential gear 32 disposed on the fourth axis C4 includes the differential ring gear 46 meshing with the differential drive gear 42. Further, the differential gear 32 includes a differential mechanism that produces a rotational speed difference between the pair of left and right drive wheels 16 as appropriate. In this way, the counter shaft 30 is connected to the drive wheels 16 in a power transmittable manner via the differential gear 32 and so on.

The second rotor shaft 28 and the reduction shaft 26 are spline-fitted to each other so as to be prevented from relative rotation therebetween. Herein, when torque fluctuation transmitted from the engine 14 is transmitted to the reduction shaft 26 via the counter shaft 30 and so on while the torque of the second electric motor MG2 is 0 Nm, the second rotor shaft 28 of the second electric motor MG2 is placed in a floating state. Therefore, the reduction shaft 26 rotationally fluctuates so that tooth hitting noise occurs due to collision between spline teeth of the second rotor shaft 28 and spline teeth of the reduction shaft 26 at the spline fitting portion 50 between the second rotor shaft 28 and the reduction shaft 26.

In this embodiment, in order to reduce the tooth hitting noise and radial vibration, an annular tolerance ring 72 is disposed near the spline fitting portion 50 where the reduction shaft 26 and the second rotor shaft 28 are coupled to each other. The annular tolerance ring 72 is interposed in a press-fit manner between wall surfaces, facing each other, of portions, overlapping each other as seen in the radial direction, of the reduction shaft 26 and the second rotor shaft 28. Hereinbelow, the structure around the connecting portion between the second rotor shaft 28 and the reduction shaft 26 (around the spline fitting portion 50) will be described.

Figure 2:
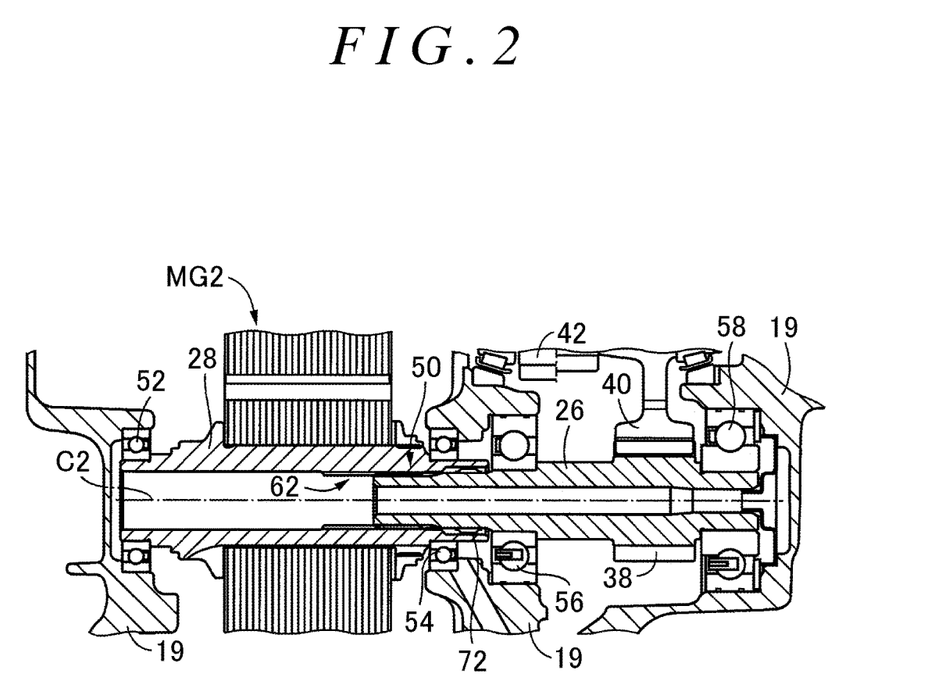
FIG. 2 is a sectional view showing respective members disposed on a second axis of the power transmission device shown in FIG. 1.
Figure 3:
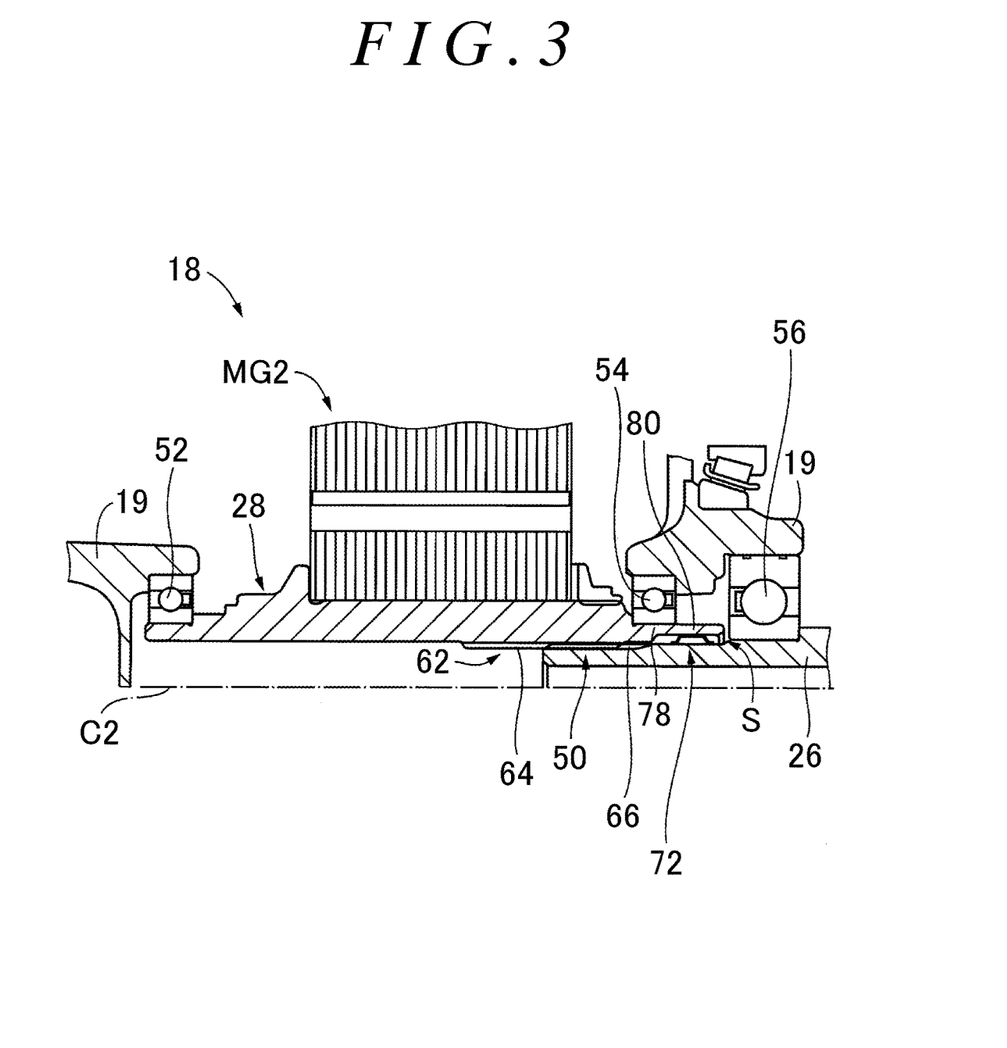
FIG. 3 is a sectional view showing on an enlarged scale a structure around a spline fitting portion where a second rotor shaft and a reduction shaft are coupled to each other on the second axis of the power transmission device shown in FIG. 1.

FIG. 2 is a sectional view showing the respective members disposed on the second axis C2 of the power transmission device 18. FIG. 3 is a sectional view showing on an enlarged scale the structure around the spline fitting portion 50 where the second rotor shaft 28 and the reduction shaft 26 are coupled to each other in the power transmission device 18.

The second rotor shaft 28 of the second electric motor MG2 is a tubular member and is supported by the pair of ball bearings 52 and 54 so as to be rotatable about the second axis C2. The second rotor shaft 28 is formed on its inner peripheral side with a fitting hole 62 into which one end of the reduction shaft 26 is fitted. A wall surface (inner peripheral surface) of the fitting hole 62 is partially formed with female spline teeth 64 for spline fitting to the reduction shaft 26. The female spline teeth 64 is an example of first spline teeth of the disclosure, while the pair of ball bearings 52 and 54 is an example of a pair of first bearings of the disclosure.

The reduction shaft 26 is supported by the pair of ball bearings 56 and 58 so as to be rotatable about the second axis C2 which is common to the second rotor shaft 28. Male spline teeth 66 are formed on an outer peripheral surface of one axial end, corresponding to the side fitted into the fitting hole 62, of the reduction shaft 26. The male spline teeth 66 are spline-fitted to the female spline teeth 64 of the second rotor shaft 28. The spline fitting portion 50 is formed by fitting the reduction shaft 26 into the fitting hole 62 so that the female spline teeth 64 and the male spline teeth 66 are spline-fitted to each other. By the formation of the spline fitting portion 50, the second rotor shaft 28 and the reduction shaft 26 are held so as to be prevented from relative rotation therebetween. The male spline teeth 66 is an example of second spline teeth of the disclosure, while the pair of ball bearings 56 and 58 is an example of a pair of second bearings of the disclosure.

An annular space S having a predetermined clearance is formed on the outer peripheral side of an end portion (one end) of the reduction shaft 26 between this end portion and an end portion (one end) of the second rotor shaft 28. The annular space S is formed between a first inner peripheral surface and a first outer peripheral surface at a portion where the end portion of the second rotor shaft 28 and the end portion of the reduction shaft 26 overlap each other as seen in the radial direction. The first inner peripheral surface is an inner peripheral surface, where the female spline teeth 64 are not formed, of the second rotor shaft 28. The first outer peripheral surface is an outer peripheral surface, where the male spline teeth 66 are not formed, of the reduction shaft 26. The annular tolerance ring 72 is press-fitted into the annular space S.

Figure 4:
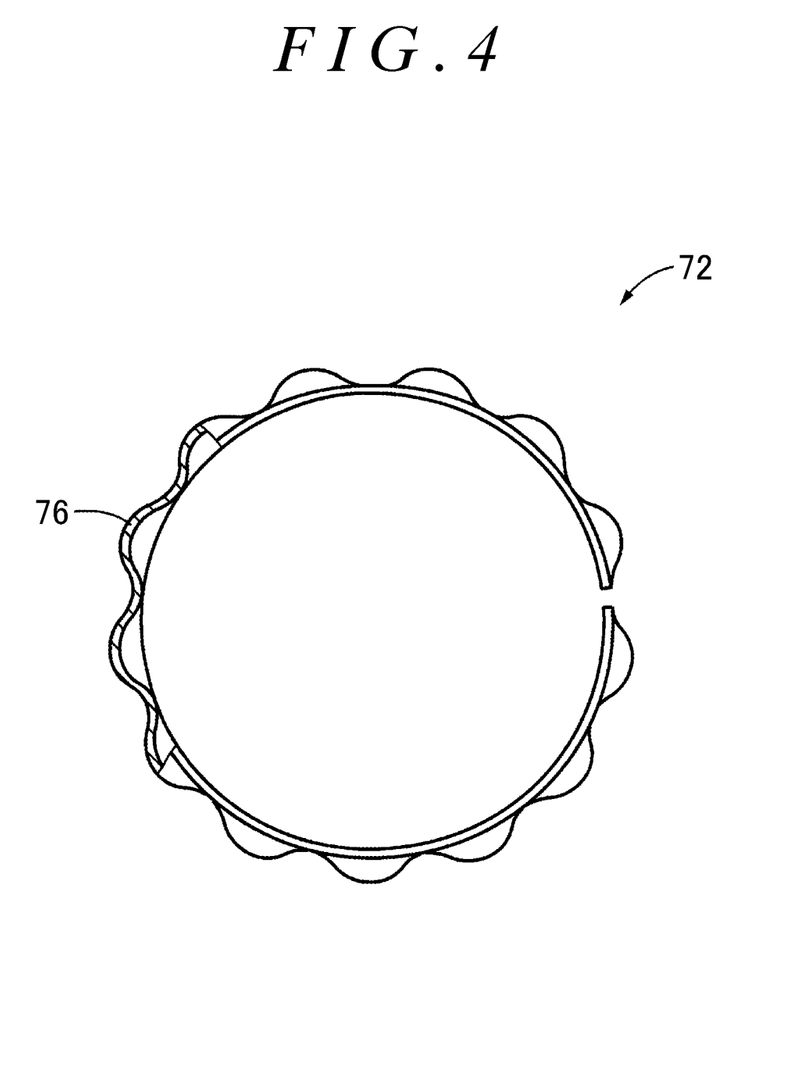
FIG. 4 is a side view of a tolerance ring disposed at a portion where the second rotor shaft and the reduction shaft overlap each other in the radial direction in FIG. 3, wherein the tolerance ring is seen in its center line direction while being partially cut out.

FIG. 4 is a diagram of the tolerance ring 72, wherein the tolerance ring 72 is seen in its center line direction while being partially cut out. The tolerance ring 72 is formed by bending a thin plate of metal such as steel or stainless steel into an annular shape and is elastically deformable in its thickness direction. The tolerance ring 72 is plastically deformable depending on the circumstances and includes a plurality of projections 76 projecting radially outward and arranged at regular intervals in the circumferential direction except at edge portions on both sides in the width direction. Accordingly, the tolerance ring 72 serves as a rattling suppression member of the disclosure. In this way, the tolerance ring 72 has mountains of the projections 76 and valleys of the projections 76 at regular intervals in its circumferential direction. Mountain top areas of the projections 76 of the tolerance ring 72 abut against the inner peripheral surface of the second rotor shaft 28. Further, valley floor areas of the projections 76 of the tolerance ring 72 abut against the outer peripheral surface of the reduction shaft 26. The tolerance ring 72 is press-fitted into the space S in the state where the projections 76 are radially compressed between the mountain top areas and the valley floor areas. A reaction force toward the inner peripheral side is constantly applied to the outer peripheral surface of the reduction shaft 26 from the valley floor areas of the projections 76. Further, a reaction force toward the outer peripheral side is constantly applied to the inner peripheral surface of the second rotor shaft 28 from the mountain top areas of the projections 76. Since the reaction forces to the outer peripheral surface and to the inner peripheral surface are equal to each other, the offset between the axis of the reduction shaft 26 and the axis of the second rotor shaft 28 is suppressed. That is, the occurrence of radial vibration is suppressed. A friction force is generated between the valley floor areas of the projections 76 of the tolerance ring 72 and the outer peripheral surface of the reduction shaft 26. Further, a friction force is generated between the mountain top areas of the projections 76 of the tolerance ring 72 and the inner peripheral surface of the second rotor shaft 28. By the friction forces generated at the tolerance ring 72, when the transmission torque is smaller than a predetermined torque value, it is possible to integrally rotate the reduction shaft 26 and the second rotor shaft 28 to transmit the torque without causing slipping between the outer peripheral surface of the reduction shaft 26 and the inner peripheral surface of the second rotor shaft 28. When the transmission torque is greater than the predetermined torque value, slipping occurs between the outer peripheral surface of the reduction shaft 26 and the valley floor areas of the projections 76 so that it is possible to allow relative rotation between the reduction shaft 26 and the second rotor shaft 28. Herein, the predetermined torque value is set to be greater than or equal to a small torque value in torque fluctuation that is generated by explosion fluctuation of the engine 14 or the like. The tolerance ring 72 serves to perform torque transmission between the reduction shaft 26 and the second rotor shaft 28 with respect to the torque fluctuation, thereby making substantially zero the rattling between the female spline teeth 64 and the male spline teeth 66 to reduce the tooth hitting noise.

In the meantime, when the power from the engine 14 is transmitted to the reduction shaft 26 via the counter shaft 30, a gear meshing reaction force and so on in the radial direction are generated by meshing between the counter driven gear 40 and the reduction gear 38. Then, due to the gear meshing reaction force and so on in the radial direction generated, the reduction shaft 26 supported at both ends by the ball bearing 56 and the ball bearing 58 is bent in the axial direction. Consequently, radial load which is vibration generated in the radial direction perpendicular to the second axis C2 acts on the tolerance ring 72 press-fitted into the space S. As a result, the reaction forces of the tolerance ring 72 respectively applied to the inner peripheral surface of the second rotor shaft 28 and to the outer peripheral surface of the reduction shaft 26 are reduced. Therefore, there is a possibility that the function of the tolerance ring 72 to reduce the radial vibration and the noise such as the tooth hitting noise at the spline fitting portion 50 may be lowered. Accordingly, it is desirable to suppress the wear of the tolerance ring 72 and the reduction shaft 26 in the radial direction due to the radial vibration caused by the gear meshing reaction force and so on. The space S is a space between the inner peripheral surface of the second rotor shaft 28 and the outer peripheral surface of the reduction shaft 26.

As shown in FIG. 3, the portion, where the female spline teeth 64 are formed, of the second rotor shaft 28 is a portion adjacent to the reduction shaft 26 side in the second axis C2 direction. Further, the second rotor shaft 28 includes a supported portion 78 supported by the ball bearing 54 located on the reduction shaft 26 side, and a shaft end portion 80 protruding to the reduction shaft 26 side from the supported portion 78. Herein, the reduction shaft 26 side is a side of the ball bearing 56 supporting a shaft end portion, where the male spline teeth 66 are formed, of the reduction shaft 26. That is, the reduction shaft 26 side represents the right side in FIG. 3. A part of the shaft end portion 80 and a part of the supported portion 78 of the second rotor shaft 28 have an inner diameter greater than the fitting hole 62 and are formed thin. The shaft end portion 80 is not supported by a ball bearing or the like at its end on the reduction shaft 26 side and is formed thin. Therefore, the support rigidity (flexural rigidity) of the shaft end portion 80 in the radial direction is low compared to the supported portion 78 and so on. The annular space S is formed between the first inner peripheral surface and the first outer peripheral surface. The first inner peripheral surface is an inner peripheral surface of a thin part of the shaft end portion 80 and of the supported portion 78. The first outer peripheral surface is an outer peripheral surface that is adjacent in the second axis C2 direction to the outer peripheral surface, where the male spline teeth 66 are formed, of the reduction shaft 26 and that is equal in outer diameter to the outer diameter of mountains of the male spline teeth 66. The tolerance ring 72 is attached by being press-fitted into the space S between the inner peripheral surface of the shaft end portion 80 and the outer peripheral surface of the reduction shaft 26.

In the power transmission device 18 thus configured, when the power from the engine 14 is transmitted to the reduction shaft 26 via the counter shaft 30, a gear meshing reaction force and so on in the radial direction are generated. When this causes radial load to be applied to the tolerance ring 72, the shaft end portion 80 whose support rigidity is low is bent and deformed in the radial direction. Therefore, a radial reaction force that is input to the tolerance ring 72 is reduced. The shaft end portion 80 is disposed on the outer peripheral side of the tolerance ring 72 and protrudes from the ball bearing 54. The gear meshing reaction force and so on in the radial direction are generated by meshing between the counter driven gear 40 and the reduction gear 38.

As described above, according to the power transmission device 18 of this embodiment, the annular tolerance ring 72 is press-fitted into the portion where the second rotor shaft 28 and the reduction shaft 26 overlap each other in the radial direction and where neither the female spline teeth 64 nor the male spline teeth 66 are formed. The tolerance ring 72 is press-fitted between the inner peripheral surface of the shaft end portion 80 and the outer peripheral surface of the reduction shaft 26. The shaft end portion 80 is a portion protruding to the reduction shaft 26 side from the supported portion 78. Further, the supported portion 78 is a portion, supported by the ball bearing 54 located on the reduction shaft 26 side, of the second rotor shaft 28. Therefore, the tolerance ring 72 is disposed between the shaft end portion 80, whose radial rigidity is lower than that of the supported portion 78, of the second rotor shaft 28 and the reduction shaft 26. Consequently, when the load is applied to the tolerance ring 72 in the radial direction at the time of transmission of the power from the engine 14 to the reduction shaft 26, the shaft end portion 80 of the second rotor shaft 28 is deformed in the radial direction so that the radial reaction force that acts on the tolerance ring 72 is reduced. Therefore, the wear of the mutual contact surfaces of the tolerance ring 72 and the reduction shaft 26 is suppressed. In this way, it is possible to suppress a reduction in the function of the tolerance ring 72 to reduce the radial vibration and the noise such as the tooth hitting noise at the spline fitting portion 50.

Next, another embodiment of the disclosure will be described. In the following embodiment, the same symbols are assigned to portions that are substantially the same in function as those of the above-described embodiment, thereby omitting detailed description thereof.

Figure 5:
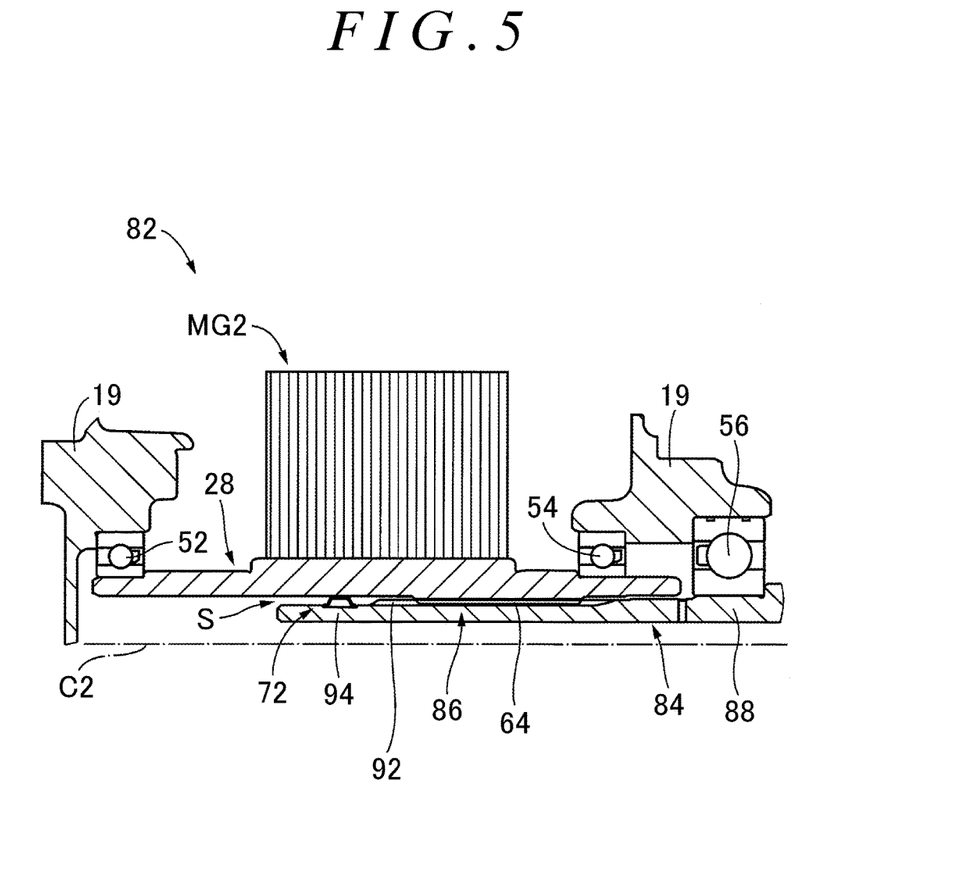
FIG. 5 is a sectional view showing on an enlarged scale a structure around a spline fitting portion where a second rotor shaft and a reduction shaft are coupled to each other in a power transmission device of another embodiment.

A power transmission device 82 of this embodiment is substantially the same in function as the above-described power transmission device 18 except that the configuration of a reduction shaft 84 and the disposed position of a tolerance ring 72 in the second axis C2 direction are different from those in the above-described power transmission device 18. Hereinbelow, those different points will be described with reference to FIG. 5. FIG. 5 is a sectional view showing on an enlarged scale a structure around a spline fitting portion 86 between a second rotor shaft 28 and the reduction shaft 84 in the power transmission device 82. The reduction shaft 84 includes a supported portion 88 supported by a ball bearing 56 located on the second rotor shaft 28 side. The reduction shaft 84 extends out in the second axis C2 direction from the supported portion 88 to the second rotor shaft 28 side. Herein, the second rotor shaft 28 side is a side of a ball bearing 52 supporting the second rotor shaft 28. That is, the second rotor shaft 28 side represents the left side in FIG. 5. The reduction shaft 84 extends out from the ball bearing 56 side to the second rotor shaft 28 side beyond one end, on the ball bearing 54 side, of female spline teeth 64. The reduction shaft 84 further extends to the second rotor shaft 28 side beyond the other end, on the ball bearing 52 side, of the female spline teeth 64. The reduction shaft 84 includes male spline teeth 92 formed on an outer peripheral surface of a part of its portion overlapping the second rotor shaft 28 in the radial direction. The male spline teeth 92 form the spline fitting portion 86 jointly with the female spline teeth 64. The reduction shaft 84 includes a shaft end portion 94 protruding from the supported portion 88 to the second rotor shaft 28 side via the portion where the male spline teeth 92 are formed. The shaft end portion 94 extends to the second rotor shaft 28 side beyond the male spline teeth 92. A space S is provided between an outer peripheral surface, where the male spline teeth 92 are not formed, of the shaft end portion 94 and an inner peripheral surface, where the female spline teeth 64 are not formed, of the second rotor shaft 28. The tolerance ring 72 is press-fitted into the space S. The shaft end portion 94 located on the inner peripheral side of the tolerance ring 72 is not supported by a ball bearing or the like at its one end opposite to its other end on the male spline teeth 92 side. Therefore, the support rigidity of the shaft end portion 94 in the radial direction is low compared to the supported portion 88 and so on. Accordingly, when radial load is applied to the tolerance ring 72, the shaft end portion 94 disposed on the inner peripheral side of the tolerance ring 72 is bent and deformed in the radial direction. Therefore, a radial reaction force that is input to the tolerance ring 72 is reduced.

As described above, according to the power transmission device 82 of this embodiment, the annular tolerance ring 72 is press-fitted into the portion where the second rotor shaft 28 and the reduction shaft 84 overlap each other in the radial direction and where neither the female spline teeth 64 nor the male spline teeth 92 are formed. The tolerance ring 72 is press-fitted between the outer peripheral surface of the shaft end portion 94 and the inner peripheral surface of the second rotor shaft 28. The shaft end portion 94 is a portion protruding from the supported portion 88 to the second rotor shaft 28 side via the portion where the male spline teeth 92 are formed. The supported portion 88 is a portion supported by the ball bearing 56 located on the second rotor shaft 28 side. Accordingly, the tolerance ring 72 is provided between the shaft end portion 94 and the second rotor shaft 28. The rigidity of the shaft end portion 94 in the radial direction is lower than that of the supported portion 88 of the reduction shaft 84. When the power from an engine 14 is transmitted to the reduction shaft 84 via a counter shaft 30, a gear meshing reaction force and so on in the radial direction are generated. When radial load is applied to the tolerance ring 72 due to the gear meshing reaction force and so on generated, the shaft end portion 94, protruding to the second rotor shaft 28 side, of the reduction shaft 84 is deformed in the radial direction. Therefore, a radial reaction force that acts on the tolerance ring 72 is reduced. Accordingly, the wear of the mutual contact surfaces of the tolerance ring 72 and the reduction shaft 84 is suppressed. The gear meshing reaction force and so on in the radial direction are generated by meshing between a counter driven gear 40 and a reduction gear 38.

While the disclosure has been described in detail with reference to the drawings, the disclosure can be carried out in still other aspects and can be added with various changes within a range not departing from the gist thereof.

For example, in the power transmission device 18 of the above-described embodiment, the female spline teeth 64 and the male spline teeth 66 are spline-fitted to each other. The female spline teeth 64 are formed in the fitting hole 62 of the second rotor shaft 28. The male spline teeth 66 are formed at one end of the reduction shaft 26. In the power transmission device 18 of the above-described embodiment, the second rotor shaft 28 and the reduction shaft 26 are coupled to each other in a power transmittable manner. However, the disclosure is not limited thereto. For example, the power transmission device 18 may be configured such that inner peripheral teeth and outer peripheral teeth are spline-fitted to each other. The inner peripheral teeth are formed on an inner peripheral surface of a tubular reduction shaft 26. The outer peripheral teeth are formed on an outer peripheral surface of one end of a second rotor shaft 28. Even in a power transmission device thus configured, if a tolerance ring is press-fitted into the following portion (1) or (2), since a shaft end portion of the second rotor shaft 28 or the reduction shaft 26 is deformed in the radial direction when radial vibration is applied to the tolerance ring, a radial reaction force that acts on the tolerance ring is reduced. The portion (1) is between an inner peripheral surface of the reduction shaft 26 and an outer peripheral surface of a shaft end portion protruding from a supported portion, supported by a ball bearing located on the reduction shaft 26 side, of the second rotor shaft 28 to the reduction shaft 26 side beyond a portion where the outer peripheral teeth are formed. The portion (2) is between an outer peripheral surface of the second rotor shaft 28 and an inner peripheral surface of a shaft end portion protruding to the second rotor shaft 28 side from a supported portion, supported by a ball bearing located on the second rotor shaft 28 side, of the reduction shaft 26.

According to the power transmission device 18 of the above-described embodiment, the space S is formed between the inner peripheral surface of a part of the shaft end portion 80 and of the supported portion 78 of the second rotor shaft 28 and the outer peripheral surface of the reduction shaft 26. The tolerance ring 72 is press-fitted into the space S. However, the disclosure is not limited thereto. A rattling suppression member may be such that its contact surface with the second rotor shaft 28 or the reduction shaft 26 may possibly be worn out due to radial vibration. For example, a hollow cylindrical composite material of metal and synthetic rubber may be press-fitted into the space S. An annular tolerance ring may have a break. Even in the case of a rattling suppression member other than the tolerance ring 72, if it is applied to the power transmission device 18, a reduction in the function of the rattling suppression member to reduce radial vibration and noise such as tooth hitting noise is suppressed.

What have been described above are merely the embodiments and, although other embodiments are not particularly shown, the disclosure can be carried out in aspects added with various changes or improvements based on knowledge of those skilled in the art within a range not departing from the gist thereof.

What is claimed is:

1. A power transmission device for a vehicle, the power transmission device comprising:
    a rotor shaft of a motor, the rotor shaft being supported by a pair of first bearings and configured to rotate about a common axis, the rotor shaft including first spline teeth;
    a gear shaft supported by a pair of second bearings and configured to rotate about the common axis, the gear shaft being formed with a reduction gear and including second spline teeth spline-fitted to the first spline teeth of the rotor shaft; and
    a rattling suppression member press-fitted into a portion of the gear shaft where the rotor shaft and the gear shaft overlap each other in a radial direction and where neither the first spline teeth nor the second spline teeth are provided, the rattling suppression member provided between a gear shaft end portion and the rotor shaft, the gear shaft end portion protruding from the gear shaft and beyond a rotor shaft side of one of the pair of second bearings, the second spline teeth being disposed between the rattling suppression member and the pair of second bearings along the common axis.

2. The power transmission device according to claim 1, wherein the rattling suppression member is a metal plate bent into an annular shape, the rattling suppression member including a plurality of projections projecting radially outward and circumferentially arranged.

3. The power transmission device according to claim 2, wherein the rattling suppression member is a tolerance ring.

* * * * *